US012682171B2

(12) United States Patent
Reis Alves et al.

(10) Patent No.: US 12,682,171 B2
(45) Date of Patent: Jul. 14, 2026

(54) CONTEXT DISAMBIGUATION USING DEEP NEURAL NETWORKS

(71) Applicant: INTERNATIONAL BUSINESS MACHINES CORPORATION, Armonk, NY (US)

(72) Inventors: Rodrigo Reis Alves, Campinas (BR); Angelo Moore, Dunboyne (IE); Valdir Salustino Guimaraes, Americana (BR); Daniela Arrigoni, Seregno (IT); Vasanthi M. Gopal, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 18/479,051

(22) Filed: Sep. 30, 2023

(65) Prior Publication Data
US 2025/0111160 A1 Apr. 3, 2025

(51) Int. Cl.
*G06F 40/30* (2020.01)
*G06F 40/186* (2020.01)

(52) U.S. Cl.
CPC ............ *G06F 40/30* (2020.01); *G06F 40/186* (2020.01)

(58) Field of Classification Search
None
See application file for complete search history.

(56) References Cited

U.S. PATENT DOCUMENTS

| | | | |
|---|---|---|---|
| 10,594,757 B1 * | 3/2020 | Shevchenko | .......... H04N 7/148 |
| 10,635,750 B1 | 4/2020 | Epstein et al. | |
| 10,861,439 B2 | 12/2020 | Doyle et al. | |
| 11,610,061 B2 * | 3/2023 | Eisenschlos | ........... G06N 3/096 |
| 12,271,697 B2 * | 4/2025 | van Dam | .............. G06F 40/274 |
| 2005/0049852 A1 | 3/2005 | Chao | |

(Continued)

FOREIGN PATENT DOCUMENTS

| | | |
|---|---|---|
| WO | 2023/059561 A1 | 4/2023 |
| WO | 2025/068001 A1 | 4/2025 |

OTHER PUBLICATIONS

Inglesias et al. "A Toxic Style Transfer Method Based on the Delete-Retrieve-Generate Framework Exploiting Toxic Semantic Similarity". Appl. Sci. 2023, 13(15), 8590, Published Jul. 26, 2023 (Year: 2023).*

(Continued)

*Primary Examiner* — Jesse S Pullias
(74) *Attorney, Agent, or Firm* — Harrity & Harrity, LLP

(57) ABSTRACT

A computer-implemented process for updating an electronic document includes the following operations. Using a preprocessor, preprocessing is performed on the electronic document to generate a computer data structure. The computer data structure is evaluated using a word sense disambiguation (WSD) engine and a deep neural network to determine a context of a sentence within the electronic document. Based upon the context, a determination is made that a word within the sentence is a word of interest. The sentence is rewritten using a mitigation engine and a large language model to generate a revised sentence that does not include the word of interest. A determination is made that the revised sentence does not include any other word of interest; and the electronic document is updated to include the revised sentence.

20 Claims, 8 Drawing Sheets

(56)                References Cited

U.S. PATENT DOCUMENTS

| | | | | |
|---|---|---|---|---|
| 2014/0358519 | A1* | 12/2014 | Mirkin | G06F 40/47 |
| | | | | 704/2 |
| 2017/0286376 | A1* | 10/2017 | Mugan | G06N 3/09 |
| 2019/0303435 | A1* | 10/2019 | Herr | G06F 16/35 |
| 2021/0004432 | A1 | 1/2021 | Li et al. | |
| 2021/0073224 | A1* | 3/2021 | Zhao | G06F 16/2282 |
| 2021/0149996 | A1 | 5/2021 | Bellegarda | |
| 2021/0294974 | A1 | 9/2021 | Gao et al. | |
| 2022/0058339 | A1* | 2/2022 | Archuleta | G06N 3/084 |
| 2022/0100962 | A1 | 3/2022 | Akhalwaya et al. | |
| 2022/0121879 | A1* | 4/2022 | Goyal | G06V 30/18057 |
| 2022/0215047 | A1 | 7/2022 | Banipal et al. | |
| 2022/0405482 | A1 | 12/2022 | Tam | |
| 2023/0137209 | A1* | 5/2023 | Nangi | G06F 40/166 |
| | | | | 704/9 |
| 2023/0153546 | A1* | 5/2023 | Peleg | G06F 40/56 |
| | | | | 704/9 |
| 2024/0303247 | A1* | 9/2024 | Sokolov | G06N 20/00 |
| 2025/0053725 | A1* | 2/2025 | Zhou | G06F 40/166 |

OTHER PUBLICATIONS

Lopukhina et al. Regular Polysemy: from sense vectors to sense patterns. Proceedings of the Workshop on Cognitive Aspects of the Lexicon, pp. 19-23, Osaka, Japan, Dec. 11-17, 2016 (Year: 2016).*

Logacheva et al. "ParaDetox: Detoxification with Parallel Data". Proceedings of the 60th Annual Meeting of the Association for Computational Linguistics vol. 1: Long Papers, pp. 6804-6818 May 22-27, 2022 (Year: 2022).*

Anand et al. "Context Aware Query Rewriting for Text Rankers using LLM". arXiv:2308.16753v1 [cs.IR] Aug. 31, 2023 (Year: 2023).*

Bott et al. "Can Spanish Be Simpler? LexSIS: Lexical Simplification for Spanish" Proceedings of COLING 2012: Technical Papers, pp. 357-374 (Year: 2012).*

Feng et al. "Sentence Simplification via Large Language Models". arXiv:2302.11957v1 [cs.CL] Feb. 23, 2023 (Year: 2023).*

Lu et al. "Facilitating Fine-grained Detection of Chinese Toxic Language: Hierarchical Taxonomy, Resources, and Benchmarks".

Proceedings of the 61st Annual Meeting of the Association for Computational Linguistics vol. 1: Long Papers, p. 16235-16250, Jul. 9-14, 2023 (Year: 2023).*

Francesca et al. "Beyond word embeddings: A survey", Information Fusion, Jan. 1, 2023, pp. 418-436, vol. 89, Issue C.

Gupta et al. "Improving Document Classification with Multi-Sense Embeddings ", arXiv:1911.07918 [cs.CL], Nov. 18, 2019, 8 pages.

International Searching Authority, "Notification of Transmittal of the International Search Report and the Written Opinion of the International Searching Authority, or Declaration," Patent Cooperation Treaty, Dec. 13, 2024, 11 pages, International Application No. PCT/EP2024/076151.

Ayetiran, E.F. et al., "An optimized Lesk-based algorithm for word sense disambiguation," Open Computer Science, Aug. 1, 2016, vol. 8, No. 1, pp. 165-172.

Huang, L. et al., "GlossBERT: BERT for word sense disambiguation with gloss knowledge," arXiv preprint, arXiv:1908.07245, Aug. 20, 2019, 6 pg.

Blevins, T. et al., "Moving down the long tail of word sense disambiguation with gloss-informed biencoders," arXiv preprint, arXiv:2005.02590, May 6, 2020, 12 pg.

Scarlini, B. et al., "With More Contexts Comes Better Performance: Contextualized Sense Embeddings for All-Round Word Sense Disambiguation," In Proceedings of the 2020 Conference on Empirical Methods in Natural Language Processing (EMNLP), Association for Computational Linguistics, 2020, pp. 3528-3539.

Bartunov, S. et al., "Breaking sticks and ambiguities with adaptive skip-gram," In Artificial Intelligence and Statistics, May 2, 2016, pp. 130-138, PMLR.

Ustalov, D. et al., "An unsupervised word sense disambiguation system for under-resourced languages," arXiv preprint, arXiv:1804. 10686, Apr. 27, 2018, 5 pg.

Mell, P. et al., The NIST Definition of Cloud Computing, National Institute of Standards and Technology, U.S. Dept. of Commerce, Special Publication 800-145, Sep. 2011, 7 pg.

Bevilacqua, M. et al., "Breaking through the 80% glass ceiling: Raising the state of the art in word sense disambiguation by incorporating knowledge graph information," In Proceedings of the 58th Annual Meeting of the Association for Computational Linguistics, 2020, pp. 2854-2864.

* cited by examiner

Detection Algorithm

The context prediction is the probability of each meaning
of x given context y:

$$p(z = k | x, y, \theta)$$

Where:    $z$: index of active meaning
            $k$: tested meaning
            $x$: word
            $y$: context
            $\theta$: token representations

FIG. 4

The similarity between Doc clause and KB is defined by the cosine similarity:

$$RWScore(A, B) = \frac{\sum_{i=1}^{n} A_i B_i}{\sqrt{\sum_{i=1}^{n} A_i^2} \sqrt{\sum_{i=1}^{n} B_i^2}}$$

Where:

A: Doc clause AdaGram output

B: Knowledge base AdaGram output

FIG. 5A

*"Cloud Provider will conduct the adoption and growth of agile and safe frameworks."*

AdaGram output:

*"Cloud Provider provides services to the new operations model that allow agile, scalable and cost-effective operational services."*

AdaGram output:

Mitigation Algorithm

FIG. 6A

Mitigation Algorithm
(continued)

Template examples:

605

- The clause "<sentence>" can be rewritten without compromises by removing the <word_pos_tagging> "<word>"

- Rewrite the clause "<sentence>" replacing the "<word>" by a synonym with less legal exposure

- Provide alternatives to the clause "<sentence>" that doesn't represent technical overcommitments

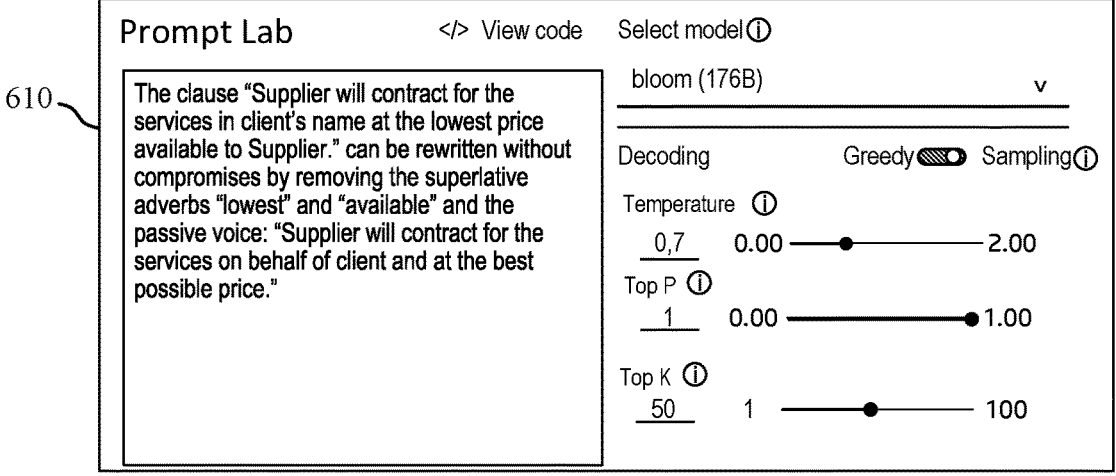

FIG. 6B

CONTEXT DISAMBIGUATION USING DEEP NEURAL NETWORKS

BACKGROUND

The present invention relates to electronic document processing using natural language processing, and more specifically, to using deep neural networks for context disambiguation in processing electronic documents.

Natural language processing is a field of computer science and linguistics concerned with the interactions between computers and human (natural) languages. NLP as a field of computer science began as a branch of artificial intelligence. Modern NLP algorithms are grounded in machine learning (ML) and include both statistical methods and neural networks. As used herein, a "NLP agent" is a special-purpose computer system including both hardware and software utilizing NLP algorithms that are configured to process electronic documents by performing natural language processing and analysis of natural language data extracted from the electronic documents.

Detecting keywords within a specific context is a common and oftentimes challenging requirement for NLP agents. While a human reader may have little trouble correctly interpreting the meaning of a particular word in a particular context, semantic ambiguity can pose problems for many NLP agents. Consequently, technologies, common known as Word Sense Disambiguation (WSD), have been developed to augment NLP algorithms. As that term is used here, the term "sense" refers to the particular meaning of a word in a particular context. For example, the word "bass" may refer to a type fish or a type of sound/instrument. These different meanings are the different "senses" of the word.

Understanding the meaning of a word in context can have many benefits during electronic document processing. For example, an electronic document containing certain words in certain contexts (e.g., legal and commercial) can create undesirable exposure for entities associated with that electronic document. As another example, where a document is subject to considerable public exposure (e.g., in a social media domain), certain words in certain contexts can cause unwanted attention. There are many uses case where identifying risky words (i.e., "words of interest") in context, can be useful in activities such as labeling/reporting, de-risking, and the blocking/censoring of profanity.

In labeling/reporting, words of interest can be identified to the creator of the electronic document and/or other users. In de-risking, words of interest can be removed or the content changed. In block/censoring, the electronic document itself or specific parts of the electronic document can be blocked or otherwise not made available for consumption by other users.

An example of such a word of interest is the word "partnership." In an informal context, the term "partnership" can refer to a collaboration or co-recreation between two entities. However, in a business/legal context, the term "partnership" can invoke the existence/establishment of a particular formal business relationship. Accordingly, the use of the term "partnership," as that term is informally used, in a business/legal context may have unwanted repercussions.

An example of labeling is an instance in which an IT service provider may want to understand how many of its active contracts relate to Cloud Service provisioning and be able to label contracts currently in process. In this instance, the phrases "[t]hird-party terms and privacy practices govern use of a Non-Supplier Cloud Service or other Service, including Content Client may provide . . . " and "[c]ontents of the "Cloud" design slides will be provided by Platform Services provider and Supplier of Cloud Solution and should include . . . " would be labeled as being associated with Cloud Service provisioning. On the other hand, a phrase "[d]epending on the altitude, time of year, and vertical temperature structure of the troposphere, these clouds may be composed of . . . " would not be labeled as being associated with Cloud Service provision despite including the word "cloud."

There are multiple known approaches to perform WSD using NLP. However, many of these approaches depend upon senses annotation for training the NLP agent, which is essentially a curated knowledge base of sentences and words. However, gathering sense annotation to generate that curated knowledge base is a labor-intensive task. Another problem with many machine learning-based NLP agents is the lack of explainability for a particular result. The term "explainability," as that term in used machine learning, refers to the ability to explain the result of the underlying machine learning model in a manner that is understood by a human. For example, if a particular term (e.g., "any") is labeled a word of interest, it would be desirable, particularly when attempting to mitigate use of that term, to understanding why the term "any" was labeled as a word of interest.

Other problems with current approaches to perform WSD includes the inability to provide a generalizable approach that spans multiple domains. For example, a particular WSD-enabled NLP agent may be required for a legal context and a different WDS-enabled NLP agent for a commercial context. Along the same lines, certain current approaches cannot be easily implemented for multiple-language applications. Consequently, there is a need to for an improved system for providing WDS-enabled NLP agents that addresses these deficiencies in the current approaches.

SUMMARY

A computer-implemented process for updating an electronic document includes the following operations. Using a preprocessor, preprocessing is performed on the electronic document to generate a computer data structure. The computer data structure is evaluated using a word sense disambiguation (WSD) engine and a deep neural network to determine a context of a sentence within the electronic document. Based upon the context, a determination is made that a word within the sentence is a word of interest. The sentence is rewritten using a mitigation engine and a large language model to generate a revised sentence that does not include the word of interest. A determination is made that the revised sentence does not include any other word of interest; and the electronic document is updated to include the revised sentence.

In other aspects, the process includes the deep neural network having an Adaptive Skip-gram (AdaGram) model. Additionally, a graphical user interface can be presented to a user and configured to prompt the user to generate the revised sentence. Also, the revised sentence can be generated using a modification template. In certain aspects, the modification template is automatically selected by the mitigation engine. In other aspects, the graphical user interface is configured to provide word level explainability regarding the sentence. A second modification template can be used to generate the revised sentence after an initial revised sentence was determined to meet a similarity evaluation or after the initial revised sentence was determined to contain other words of interest.

A computer hardware system for updating an electronic document includes a hardware processor configured to perform the following executable operations. Using a preprocessor, preprocessing is performed on the electronic document to generate a computer data structure. The computer data structure is evaluated using a word sense disambiguation (WSD) engine and a deep neural network to determine a context of a sentence within the electronic document. Based upon the context, a determination is made that a word within the sentence is a word of interest. The sentence is rewritten using a mitigation engine and a large language model to generate a revised sentence that does not include the word of interest. A determination is made that the revised sentence does not include any other word of interest; and the electronic document is updated to include the revised sentence.

In other aspects, the system includes the deep neural network having an Adaptive Skip-gram (AdaGram) model. Additionally, a graphical user interface can be presented to a user and configured to prompt the user to generate the revised sentence. Also, the revised sentence can be generated using a modification template. In certain aspects, the modification template is automatically selected by the mitigation engine. In other aspects, the graphical user interface is configured to provide word level explainability regarding the sentence. A second modification template can be used to generate the revised sentence after an initial revised sentence was determined to meet a similarity evaluation or after the initial revised sentence was determined to contain other words of interest.

A computer program product includes a computer readable storage medium having stored therein program code for updating an electronic document. The program code, which when executed by a computer hardware system, cause the computer hardware system to perform the following. Using a preprocessor, preprocessing is performed on the electronic document to generate a computer data structure. The computer data structure is evaluated using a word sense disambiguation (WSD) engine and a deep neural network to determine a context of a sentence within the electronic document. Based upon the context, a determination is made that a word within the sentence is a word of interest. The sentence is rewritten using a mitigation engine and a large language model to generate a revised sentence that does not include the word of interest. A determination is made that the revised sentence does not include any other word of interest; and the electronic document is updated to include the revised sentence.

In other aspects, the computer program product includes the deep neural network having an Adaptive Skip-gram (AdaGram) model. Additionally, a graphical user interface can be presented to a user and configured to prompt the user to generate the revised sentence. Also, the revised sentence can be generated using a modification template. In certain aspects, the modification template is automatically selected by the mitigation engine. In other aspects, the graphical user interface is configured to provide word level explainability regarding the sentence. A second modification template can be used to generate the revised sentence after an initial revised sentence was determined to meet a similarity evaluation or after the initial revised sentence was determined to contain other words of interest.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 4 illustrates a detection algorithms according to aspects of the present invention.

FIGS. 5A-C illustrate a similarity measurement and different AdaGram outputs for different sentences according to aspects of the present invention.

FIG. 6A-B illustrate a mitigation algorithm according to aspects of the present invention.

DETAILED DESCRIPTION

Figure 1:
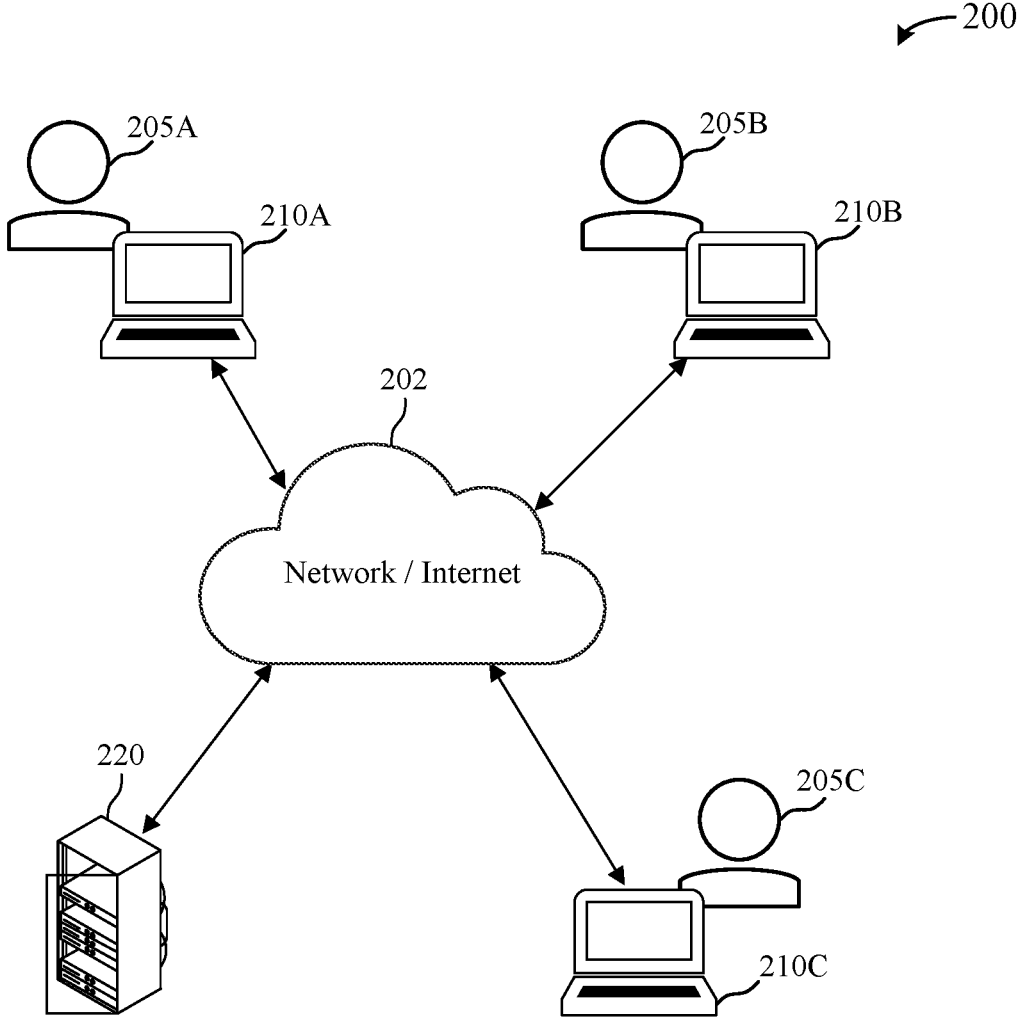
FIG. 1 is a block diagram of a deep context disambiguation system according to an aspect of the present invention.
Figure 2:
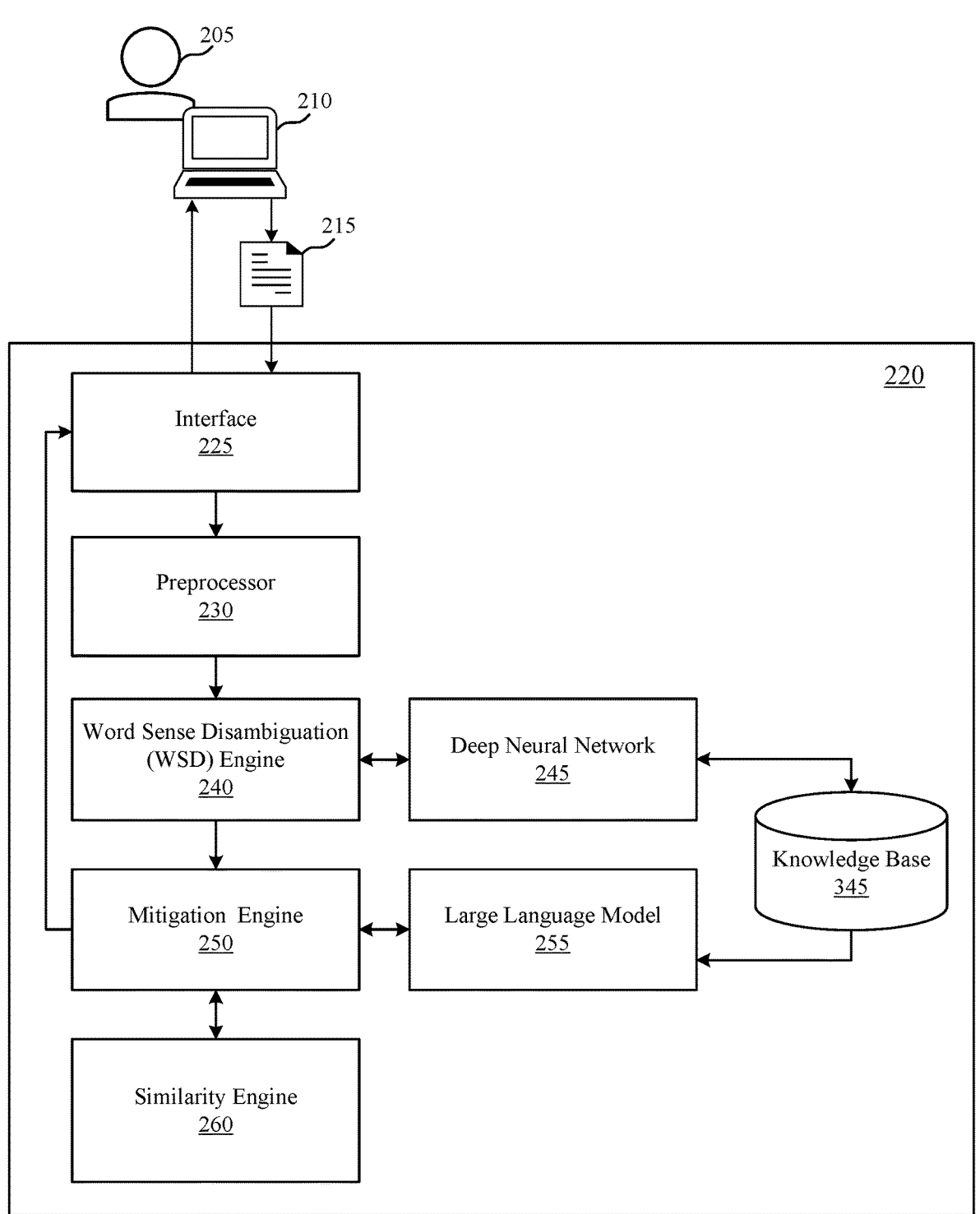
FIG. 2 is a block diagram further illustrating the deep context disambiguation system of FIG. 1.
Figure 3:
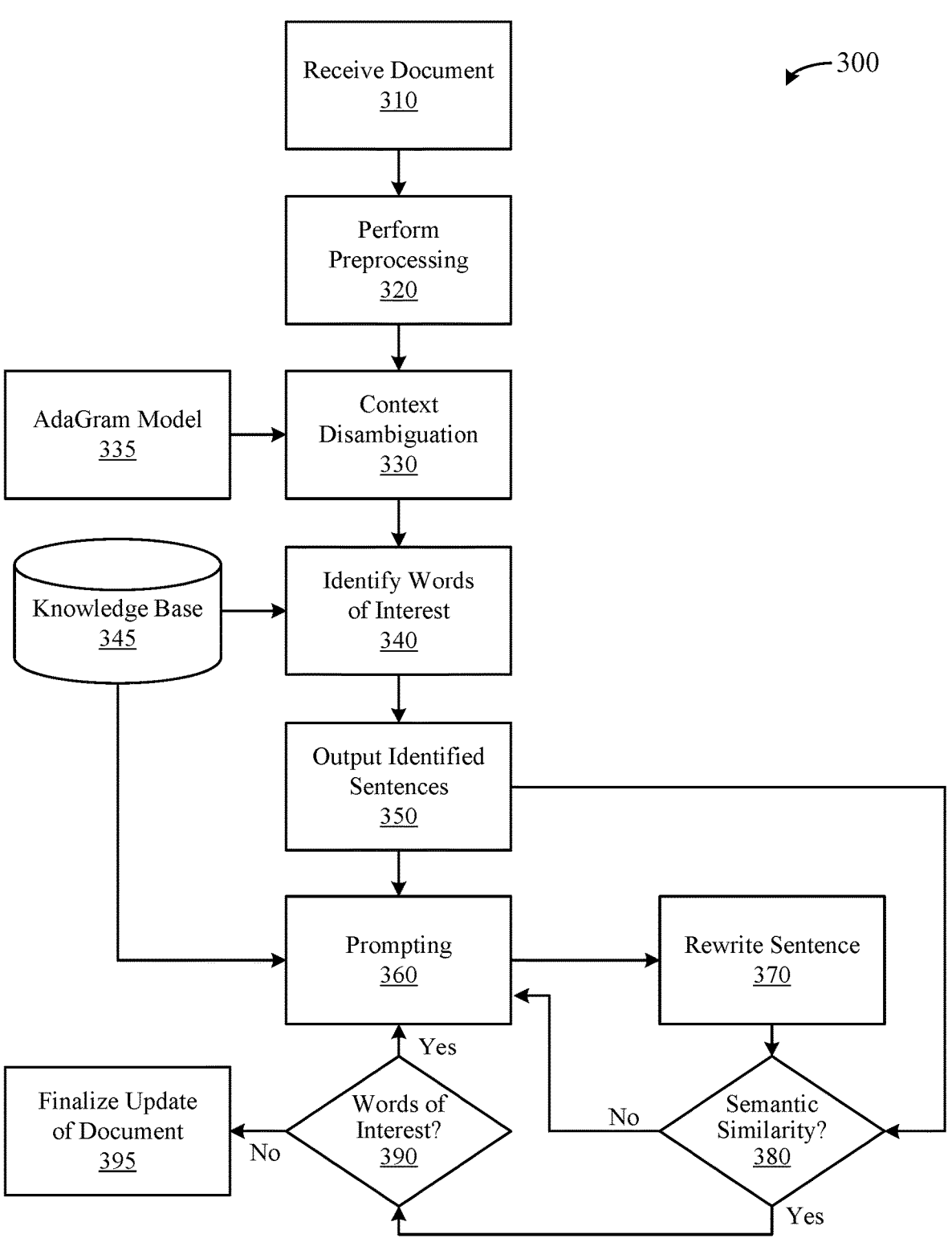
FIG. 3 is a block diagram illustrating an example method using the architecture of FIG. 2 according to an aspect of the present invention.

Reference is made to FIGS. 1-3, which respectively illustrate an architecture 200 and methodology 300 and for training a NLP agent as part of a deep context disambiguation system 220 for use in the processing of one or more electronic documents 215 generated, for example, by users 205A-C on client devices 210A-C. Although the deep context disambiguation system 220 is illustrated as including components 225-260, one or more of these components 225-260 may be external to the deep context disambiguation system 220. For example, the deep neural network 245, large language model 255, and knowledge base 345 could be located in the cloud, as described in more detail with regard to FIG. 7.

The knowledge base 345 includes words of interest. As used herein, the phrase "word of interest" is defined as a word (or phrase) that have been previously determined to be risky in a particular context. In so doing, the knowledge base 345 can map a particular word of interest to a particular context. The manner by which the mapping is performed is not limited as to a particular approach. For example an approved list and/or an unapproved list can be employed. For example, an approved list can includes those context(s) that do not make a particular word a "word of interest." Alternatively, an unapproved list can include those context (s) that makes a particular word a "word of interest." Regardless of the approach, the knowledge base 345 includes information that allows the word sense disambiguation engine 240 to determine whether a particular word is a "word of interest" based upon use of that particular word in a particular context.

Although not limited in this manner, using a preprocessor 230, preprocessing is performed on the electronic document 225 to generate a computer data structure. The computer data structure is then evaluated using a Word Sense Disambiguation (WSD) engine 240 and a deep neural network 245 to determine a context of a sentence within the electronic document 225. Based upon the context, a determination is made that a word within the sentence is a word of interest. The sentence is rewritten using a mitigation engine 250 and a large language model 225 to generate a revised sentence that does not include the word of interest. A determination is made that the revised sentence does not include any other word of interest; and the electronic document 225 is updated to include the revised sentence.

In 310, the operation begins with receipt, by the deep context disambiguation system 220, of a document 215 from a client device 210 associated with a user 205. Although not limited in this manner, the deep context disambiguation system 220 can receive the document 215 over a network 202 via an interface 225 (e.g., an API).

In 320, once the document 215 has been received, a preprocessor 230 performs preprocessing on the document 215. The preprocessing can include but is not limited to removing not useful information and formatting/tokenizing textual content. Preprocessing of documents is well-known in natural language processing, and the deep context disambiguation system 220 is not limited as to particular preprocessor 230 so capable. In certain aspects, the preprocessing also includes defining sentence boundaries (e.g., delineating one sentence from another) and the filtering of noises. The output of the preprocessing operation 320 is a computer data structure, and although not limited in this manner, the computer data structure can specifically identify each sentence within the document 215 and associated tokenized contextual content with each sentence.

In 330, the computer data structure generated by the preprocessor 230 is provided to a WSD engine 240 to provide word sense disambiguation (i.e., determine the meaning of the words within the sentences of the document 215 in a given context). Although not limited in this manner, the WSD engine 240 can employ a deep neural network 245 employing one or more of the detection algorithms to perform the word sense disambiguation. Although illustrated as separate from the WSD engine 240, some or all of the deep neural network 245 can be included within the WSD engine 240. Detection algorithms for use with the deep neural network 245 are subsequently described with reference to FIGS. 4A-C and 5A-B. As one example and in reference to FIGS. 4A and 5A-B, an Adaptive Skip-gram (AdaGram) model 335 can be employed.

In 340, the WSD engine 240 uses the knowledge base 345 and the output of the deep neural network 245 regarding context to identify words of interest. As previously discussed, the knowledge base 345 includes information that allows the WSD engine 240 to determine whether a particular word is a "word of interest" based upon use of that particular word in a particular context. The word itself is an output of the preprocessor 230 and the context is an output of the WSD engine 240 in conjunction with the deep neural network 245.

Although not limited in this manner, the determination of a word of interest can include evaluating, from the words provided by the preprocessing 230, only those words that have been identified in the knowledge base 345 as potential words of interest (i.e., there is at least one context in which the word can be evaluated as being a word of interest). In this instance, the WSG engine 240 can be configured to determine a context only for those words identified as being a potential word of interest. This aspect improves the processing efficiency by not evaluating the context for words not previously identified as being potentially evaluated as a word of interest.

Once a potential word of interest has been identified, the potential word of interest and associated sentence are analyzed by the WSD engine 240 and deep neural network 245 to determine a particular context of the sentence and the meaning of the potential word of interest within this particular context. In 350, based upon the identified particular context of the sentence and the information contained within the knowledge base 345 associated with the evaluated word is a word of interest, that sentence is identified and outputted by the WSD engine 240 to the mitigation engine 250.

In 360, for each particular sentence identified by the WSD engine 240, a mitigation algorithm involving prompting is performed. An example of a mitigation algorithm is discussed with regard to FIGS. 6A-B.

In 370, each of the identified sentences are rewritten. Although not limited in this manner, the identified sentence can be rewritten using generative AI using a large language model 255. Illustrative examples of generative AI using large language models 225 include BLOOM (BigScience Large Open-Science Open-access Multilingual Language Model) and PaLM (Pathways Language Model).

In 380, a similarity analysis between the original sentence and the rewritten sentence is performed using a similarity engine 260. Although illustrated as separate from the mitigation engine 250, some or all of the similarity engine 260 can be included within the mitigation engine 250. The similarity engine 260 functions to compare the contextual meaning of the two sentences being input into the similarity engine 260 to generate a measure of similarity. Many difference approaches to determining sentence similarity are known, and the similarity engine 260 is not limited as to a particular approach. One such approach is BERT (Bidirectional Encoder Representations from Transformers), which is a deep learning model in which every output element is connected to every input element and the weightings between them are dynamically calculated based upon their connection.

Figure 5C:
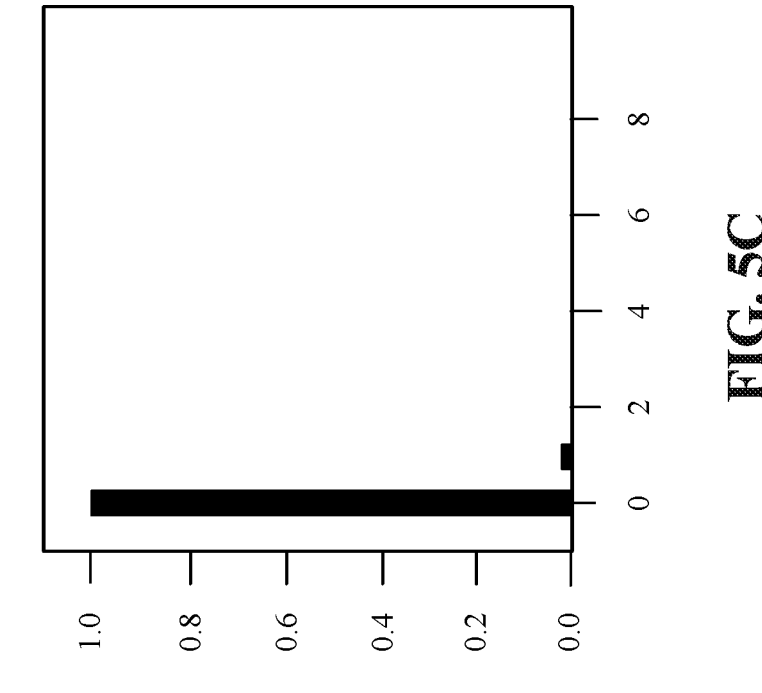
Figure 5B:
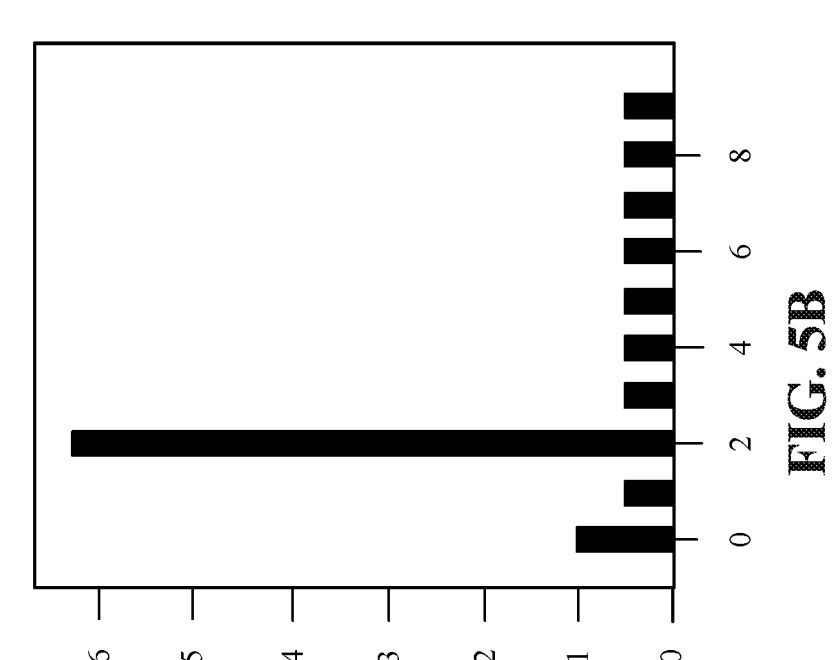

An example of an algorithm for determining similarity is illustrated in FIG. 5A. FIGS. 5B and 5C illustrate an instance in which the illustrated sentences were evaluated using AdaGram and the respective outputs show that these two sentences are not sufficient similar to one another.

Regardless of the approach, the similarity measure outputs a similarity measure. That similarity measure is then evaluated versus some predetermined value. If the generated sentence is not sufficiently similar to the original sentence (e.g., the similarity measure fails the evaluation), the new generated sentence is deemed unacceptable, and the process 300 returns to the prompting 360 operation so as to ultimately repeat the operations of generating a new sentence in operation 370. However, if the generated sentence is sufficiently similar to the original sentence (e.g., the similarity measure passes the evaluation), the process 300 proceeds to operation 390.

In 390, an evaluation is performed as to whether the generated sentence contains words of interest. This operation is similar to that performed in operation 340, which identifies sentences that contain previously-identified words of interest contained within the knowledge base 345. If the new generated sentence contains words of interest, the new generated sentence is deemed unacceptable, and the process 300 returns to the prompting 360 operation so as to ultimately repeat the operations of generating a new sentence in operation 370. However, the new generated sentence does not contain words of interest, the process proceeds to operation 395.

As discussed above, operations 350-390 are performed for each identified sentence output in 350. Only after each sentence has been rewritten (in operation 370) and successfully been evaluated in operations 380 and 390 does the process proceed to 395. However, in certain aspects, a user 205 may have the option to override either the evaluation in 380 or 390. This can be performed, for example, by presenting, in the client device 210, a prompt that asks the user whether to accept the revised sentence despite the revised sentence not being sufficiently semantically similar to the original sentence (i.e., operation 380) and/or still containing risk words (i.e., operation 390). If the user accepts the generated sentence, the process 300 does not return to the prompting operation 360.

In 395, an update to the electronic document 215 is finalized. This operation can include for example, modifying the electronic document 215 by replacing, respectively, the identified sentence(s) identified in 350 with the generated sentences generated in 370. The updated electronic document 215 can then be forwarded to the client device 210. Additionally or alternatively, the finalizing of an update to the electronic document 215 can include publishing and/or storing the electronic document 215. Different detection algorithms can be used with the disambiguation engine 240 and deep neural network 245 are disclosed. As discussed above, the disambiguation engine 240 and deep neural network 245 are not limited as to a particular detection algorithm.

Referring to FIG. 4, a detection algorithm is illustrated that uses an Adaptive Skip-gram (AdaGram) model 335. The AdaGram model 335 is a nonparametric Bayesian extension of Skip-gram that is capable of automatically learning the required number of representations for all words at a desired semantic resolution. Advantages of employing a AdaGram model 335 are less false positions, self-supervised training (i.e., no need for annotation when training the model 335), flexibility (i.e., the model 335 can be domain and/or language specific), and is capable of learning shades of meaning (i.e., the model 335 can learn small, subtle differences of meaning, which are important for word sense disambiguation).

Referring to FIG. 6A-B, a mitigation algorithm for performing the prompting operation 360 is illustrated. In this mitigation algorithm, the mitigation engine 250 can provide a prompt to the client device 210 for the user 205 to automatically correct word(s) of interest. If accepted, the mitigation engine 250 can perform automatic operations, such as those described in operation 370, to rewrite the sentence. The user 205 can then be provided with prompts, via the client device 210, to accept these changes.

Additionally, as illustrated in FIG. 6B, the mitigation engine 250 can include a plurality of modification templates 605 that can be subsequently used by the large language model 255 in operation 370 to rewrite the sentence. In certain aspects, the particular modification template 605 to be employed in operation 370 can be automatically selected by the mitigation engine 250 based upon information contained within the knowledge base 345. As previously discussed, in the process 300 returns to the prompting operation 360 (e.g., from operation 380 or operation 390), a different modification template 605 can be employed to be used in operation 370.

As also illustrated in FIG. 6B, the mitigation engine 250 can provide a graphical user interface 610 that can permit a user 205 to select a particular AI generative large language model 255 to be employed during operation 370 as well as to adjust parameters associated therewith. The graphical user interface 610 can also provide word level explainability with regard to why a particular word was deemed to be a word of interest. This can include providing information that includes but is not limited to (i) the word, (ii) the particular context, and (iii) the generated new sentence.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 7:
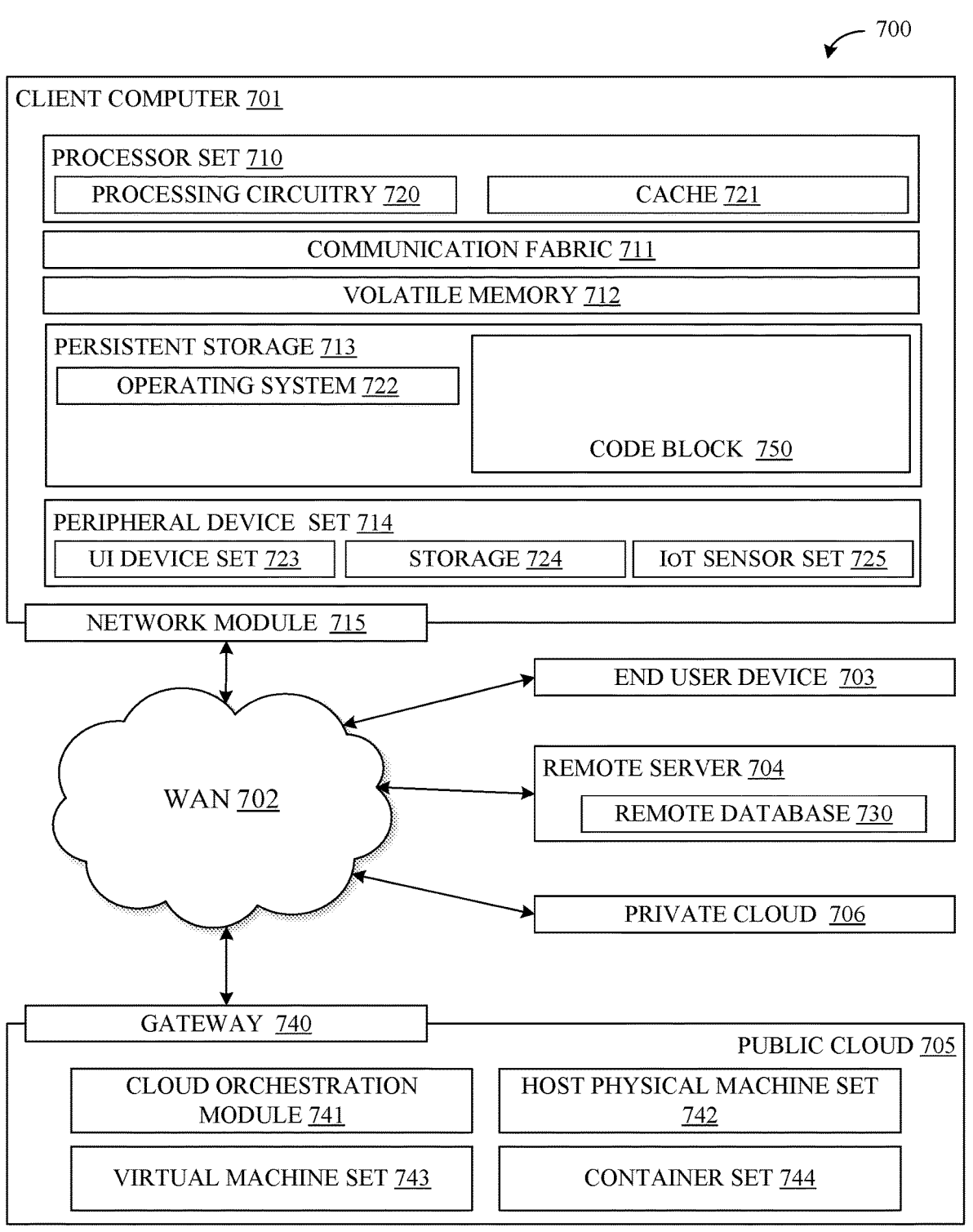
FIG. 7 is a block diagram illustrating an example of computer hardware system for implementing the deep context disambiguation system of FIG. 2.

Referring to FIG. 7, computing environment 700 contains an example of an environment for the execution of at least some of the computer code involved in performing the inventive methods, such as code block 750 for implementing the operations of the deep context disambiguation system 220 and client devices 210A-C. Computing environment 700 includes, for example, computer 701, wide area network (WAN) 702, end user device (EUD) 703, remote server 704, public cloud 705, and private cloud 706. In certain aspects, computer 701 includes processor set 710 (including processing circuitry 720 and cache 721), communication fabric 711, volatile memory 712, persistent storage 713 (including operating system 722 and method code block 750), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. However, to simplify this presentation of computing environment 700, detailed discussion is focused on a single computer, specifically computer 701. Computer 701 may or may not be located in a cloud, even though it is not shown in a cloud in FIG. 7 except to any extent as may be affirmatively indicated.

Processor set 710 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In certain computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in code block 750 in persistent storage 713.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 711 is the signal conduction paths that allow the various components of computer 701 to communicate with each other. Typically, this communication fabric 711 is made of switches and electrically conductive paths, such as the switches and electrically conductive paths that make up busses, bridges, physical input/output ports and the like. Other types of signal communication paths may be used for the communication fabric 711, such as fiber optic communication paths and/or wireless communication paths.

Volatile memory 712 is any type of volatile memory now known or to be developed in the future. Examples include dynamic type random access memory (RAM) or static type RAM. Typically, the volatile memory 712 is characterized by random access, but this is not required unless affirmatively indicated. In computer 701, the volatile memory 712 is located in a single package and is internal to computer 701. In addition to alternatively, the volatile memory 712 may be distributed over multiple packages and/or located externally with respect to computer 701.

Persistent storage 713 is any form of non-volatile storage for computers that is now known or to be developed in the future. The non-volatility of the persistent storage 713 means that the stored data is maintained regardless of whether power is being supplied to computer 701 and/or directly to persistent storage 713. Persistent storage 713 may be a read only memory (ROM), but typically at least a portion of the persistent storage 713 allows writing of data, deletion of data and re-writing of data. Some familiar forms of persistent storage 713 include magnetic disks and solid state storage devices. Operating system 722 may take several forms, such as various known proprietary operating systems or open source Portable Operating System Interface type operating systems that employ a kernel. The code included in code block 750 typically includes at least some of the computer code involved in performing the inventive methods.

Peripheral device set 714 includes the set of peripheral devices for computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some aspects, storage 724 may take the form of a quantum computing storage device for storing data in the form of qubits. In aspects where computer 701 is required to have a large amount of storage (for example, where computer 701 locally stores and manages a large database) then this storage 724 may be provided by peripheral storage devices designed for storing very large amounts of data, such as a storage area network (SAN) that is shared by multiple, geographically distributed computers. Internet-of-Things (IoT) sensor set 725 is made up of sensors that can be used in IoT applications. For example, one sensor may be a thermometer and another sensor may be a motion detector.

Network module 715 is the collection of computer software, hardware, and firmware that allows computer 701 to communicate with other computers through a Wide Area Network (WAN) 702. Network module 715 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 715 are performed on the same physical hardware device. In other aspects (for example, aspects that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any Wide Area Network (for example, the internet) capable of communicating computer data over non-local distances by any technology for communicating computer data, now known or to be developed in the future. In some aspects, the WAN 702 ay be replaced and/or supplemented by local area networks (LANs) designed to communicate data between devices located in a local area, such as a Wi-Fi network. The WAN 702 and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In certain aspects, EUD 703 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704. As defined herein, the term "server" means a data processing system configured to share services with one or more other data processing systems.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705.

The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other aspects, a private cloud 706 may be disconnected from the internet entirely (e.g., WAN 702) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 705 and private cloud 706 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for updating an electronic document employing a preprocessor, a word sense disambiguation (WSD) engine, and a mitigation engine, comprising:

performing preprocessing on the electronic document, using the preprocessor, to generate a computer data structure;

identifying, using a knowledge base that stores a mapping between one or more words of interest and one or more contexts, that a sentence within the electronic document includes a potential word of interest by identifying at least one context of the one or more contexts in which the potential word of interest is a word of interest;

determining, by evaluating the computer data structure using the WSD engine and a deep neural network, a particular context of the potential word of interest using the knowledge base;

determining, based upon the particular context, that the potential word of interest is the word of interest;

rewriting the sentence, using the mitigation engine and a large language model, to generate a revised sentence that does not include the word of interest;

determining, using a similarity engine to compare a contextual meaning associated with the sentence and the revised sentence, that the revised sentence is sufficiently similar to the sentence;

determining that the revised sentence does not include any other word of interest; and updating the electronic document to include the revised sentence responsive to determining that the revised sentence is sufficiently similar to the sentence and responsive to determining that the revised sentence does not include the any other word of interest.

2. The method of claim 1, wherein the deep neural network includes an Adaptive Skip-gram (AdaGram) model.

3. The method of claim 1, wherein a graphical user interface is presented to a user, and the graphical user interface is configured to prompt the user to generate the revised sentence.

4. The method of claim 1, wherein the revised sentence is generated using a modification template.

5. The method of claim 4, wherein the modification template is automatically selected by the mitigation engine.

6. The method of claim 4, wherein a graphical user interface is presented to a user, and the graphical user interface is configured to provide word level explainability regarding the sentence.

7. The method of claim 4, wherein a second modification template is used to generate the revised sentence after an initial revised sentence was determined to meet a similarity evaluation.

8. The method of claim 4, wherein a second modification template is used to generate the revised sentence after an initial revised sentence was determined to contain other words of interest.

9. A computer hardware system for updating an electronic document, comprising:

a hardware processor including a preprocessor, a word sense disambiguation (WSD) engine, and a mitigation engine configured to perform the following executable operations:

performing preprocessing on the electronic document, using the preprocessor, to generate a computer data structure;

identifying, using a knowledge base that stores a mapping between one or more words of interest and one or more contexts, that a sentence within the electronic document includes a potential word of interest by identifying at least one context of the one or more contexts in which the potential word of interest is a word of interest;

determining, by evaluating the computer data structure using the WSD engine and a deep neural network, a particular context of the potential word of interest using the knowledge base;

determining, based upon the particular context, that the potential word of interest is the word of interest;

rewriting the sentence, using the mitigation engine and a large language model, to generate a revised sentence that does not include the word of interest;

determining, using a similarity engine to compare a contextual meaning associated with the sentence and the revised sentence, that the revised sentence is sufficiently similar to the sentence;

determining that the revised sentence does not include any other word of interest; and updating the electronic document to include the revised sentence responsive to determining that the revised sentence is sufficiently similar to the sentence and responsive to determining that the revised sentence does not include the any other word of interest.

10. The system of claim 9, wherein the deep neural network includes an Adaptive Skip-gram (AdaGram) model.

11. The system of claim 9, wherein a graphical user interface is presented to a user, and the graphical user interface is configured to prompt the user to generate the revised sentence.

12. The system of claim 9, wherein the revised sentence is generated using a modification template.

13. The system of claim 12, wherein the modification template is automatically selected by the mitigation engine.

14. The system of claim 12, wherein a graphical user interface is presented to a user, and the graphical user interface is configured to provide word level explainability regarding the sentence.

15. The system of claim 12, wherein a second modification template is used to generate the revised sentence after an initial revised sentence was determined to meet a similarity evaluation.

16. The system of claim 12, wherein a second modification template is used to generate the revised sentence after an initial revised sentence was determined to contain other words of interest.

17. A computer program product, comprising:

a computer readable storage medium having stored therein program code for updating an electronic document, the program code, which when executed by a computer hardware system including a preprocessor, a word sense disambiguation (WSD) engine, and a mitigation engine, cause the computer hardware system to perform:

performing preprocessing on the electronic document, using the preprocessor, to generate a computer data structure;

identifying, using a knowledge base that stores a mapping between one or more words of interest and one or more contexts, that a sentence within the electronic document includes a potential word of interest by identifying at least one context of the one or more contexts in which the potential word of interest is a word of interest;

determining, by evaluating the computer data structure using the WSD engine and a deep neural network, a particular context of the potential word of interest using the knowledge base;

determining, based upon the particular context, that the potential word of interest is the word of interest;

rewriting the sentence, using the mitigation engine and a large language model, to generate a revised sentence that does not include the word of interest;

determining, using a similarity engine to compare a contextual meaning associated with the sentence and the revised sentence, that the revised sentence is sufficiently similar to the sentence;

determining that the revised sentence does not include any other word of interest; and updating the electronic document to include the revised sentence responsive to determining that the revised sentence is sufficiently similar to the sentence and responsive to determining that the revised sentence does not include the any other word of interest.

18. The computer program product of claim 17, wherein the deep neural network includes an Adaptive Skip-gram (AdaGram) model.

19. The computer program product of claim 17, wherein the revised sentence is generated using a modification template.

20. The computer program product of claim 17, wherein a second modification template is used to generate the revised sentence after an initial revised sentence was determined to:

meet a similarity evaluation or contain other words of interest.

* * * * *